United States Patent
Weed et al.

(10) Patent No.: US 9,315,982 B2
(45) Date of Patent: Apr. 19, 2016

(54) SEPTIC SYSTEM WITH OVERFLOW DISCHARGE SYSTEM

(71) Applicant: John Matthew Weed, Richmond, KY (US)

(72) Inventors: John Matthew Weed, Richmond, KY (US); Christopher Edward Sharon, Richmond, KY (US)

(73) Assignee: John Matthew Weed, Richmond, KY (US)

(*) Notice: Subject to any disclaimer, the term of this patent is extended or adjusted under 35 U.S.C. 154(b) by 142 days.

(21) Appl. No.: 14/208,163

(22) Filed: Mar. 13, 2014

(65) Prior Publication Data

US 2014/0261770 A1    Sep. 18, 2014

Related U.S. Application Data

(60) Provisional application No. 61/786,900, filed on Mar. 15, 2013.

(51) Int. Cl.
| | | |
|---|---|---|
| *E03F 5/10* | (2006.01) | |
| *E03F 5/22* | (2006.01) | |
| *E03F 11/00* | (2006.01) | |
| *C02F 3/28* | (2006.01) | |

(52) U.S. Cl.
CPC . *E03F 11/00* (2013.01); *C02F 3/28* (2013.01); *E03F 5/101* (2013.01); *E03F 5/22* (2013.01); *Y10T 137/6991* (2015.04)

(58) Field of Classification Search
CPC ............. E03F 5/101; E03F 5/102; E03F 5/22; E03F 11/00; C02F 3/28; C02F 3/284; C02F 3/288
USPC ................................. 210/170.08, 254, 532.2
See application file for complete search history.

(56) References Cited

U.S. PATENT DOCUMENTS

| 2,921,681 | A | * | 1/1960 | Toulmin, Jr. | ............... | C02F 3/28 |
| | | | | | | 210/747.1 |
| 4,094,773 | A | * | 6/1978 | Beaumont | ................. | C02F 3/28 |
| | | | | | | 210/630 |
| 4,123,358 | A | * | 10/1978 | Flagge | ....................... | C02F 3/28 |
| | | | | | | 210/170.08 |
| 4,818,384 | A | * | 4/1989 | Mayer | .................... | B01D 24/24 |
| | | | | | | 210/254 |
| 4,919,343 | A | | 4/1990 | Van Luik, Jr. et al. | | |
| 5,342,523 | A | * | 8/1994 | Kuwashima | ............... | C02F 3/28 |
| | | | | | | 210/532.2 |
| 5,439,180 | A | | 8/1995 | Baughman et al. | | |

(Continued)

FOREIGN PATENT DOCUMENTS

WO    WO 2013/037372    *    3/2013

OTHER PUBLICATIONS

"Sewage Treatment", Wikipedia, Mar. 9, 2014. http://en.wikipedia.org/wiki/Primary_sewage_treatment#Primary_treatment; Accessed Mar. 14, 2014.

*Primary Examiner* — Christopher Upton
(74) *Attorney, Agent, or Firm* — Frost Brown Todd LLC (57) ABSTRACT

An embodiment of a septic system comprises a primary tank, a wastewater inlet, and a passive overflow discharge system. The wastewater inlet is in fluid communication with the interior cavity of the primary tank, and the passive overflow discharge system comprises an overflow repository that is in fluid communication with at least one of the interior cavity of the primary tank and the wastewater inlet. In various embodiments, the overflow repository can comprise at least one auxiliary tank, a leach field system or combinations thereof.

19 Claims, 3 Drawing Sheets

(56) References Cited

U.S. PATENT DOCUMENTS

| | | |
|---|---|---|
| 6,059,208 A | 5/2000 | Struthers |
| 6,202,675 B1 | 3/2001 | Forte |
| 6,299,080 B1 | 10/2001 | Freemire |
| 6,395,181 B1 | 5/2002 | Mullerheim |
| 6,488,853 B1 | 12/2002 | Mullerheim |
| 6,562,236 B2 * | 5/2003 | Rylander .................. E03F 1/00 210/170.08 |
| 6,641,721 B2 | 11/2003 | Mullerheim |
| 8,032,256 B1 | 10/2011 | Wolf et al. |
| 2011/0278220 A1 * | 11/2011 | Lowe ...................... C02F 3/288 210/617 |

* cited by examiner

SEPTIC SYSTEM WITH OVERFLOW DISCHARGE SYSTEM

PRIORITY

This application claims priority to U.S. Provisional Patent Application Ser. No. 61/786,900, filed Mar. 15, 2013, entitled "Grinder Pump Overflow Discharge System," the disclosure of which is incorporated by reference herein.

FIELD

The disclosed technology pertains to a passive overflow discharge system for use with a septic system.

BACKGROUND

Septic systems are a type of on-site sewage facility ("OSSF") which can be installed to handle wastewater and sewage (collectively referred to herein as "wastewater") from buildings that are not situated closely to a main sewage line. The need for a septic system is often associated with rural areas, or older buildings and technology. However, a significant portion of the United States population still relies on a septic system and even large cities have entire neighborhoods and suburbs that still require septic systems.

While some septic systems may be installed and operate problem free for many years, there are a number of common issues that can impact their performance and usability. As an example, some septic systems include a septic tank, which can have a conventional grinder pump system installed therein. The grinder pump system may be configured to reduce wastewater to an easily pumped form and then pump it away from a home or other structure to a remote sewer line or a leach field. As with many motorized devices, a grinder pump system can fail without warning despite proper maintenance. When a grinder pump fails, a septic system can quickly become backed up, resulting in various problems, including an inability to remove wastewater from the structure, and, if not corrected quickly enough, an overflow of wastewater into the structure.

Some septic systems have alarms which rely on float switches to detect when the wastewater level in a septic tank rises above a certain level and alert a homeowner or occupant to a potential issue. When functioning properly, such an alarm can provide early warning of a grinder pump failure or other fault and allow an individual to act before wastewater overflows into the structure. However, as with other electric components, such an alarm system can also fail due to loss of power or an electrical fault and provide a homeowner or occupant with a false sense of security.

While a variety of septic systems have been made and used, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As used herein, the term "passive overflow discharge system" refers to a system that does not require electrical power in order to, at least temporarily, prevent wastewater from flowing back into a wastewater inlet. The passive overflow discharge systems described herein are configured to alleviate the potential problem of wastewater overflowing back into a structure as a result of a power outage, mechanical malfunction or some other problem with the primary tank and the components contained therein and to allow the system to continue to function while the user corrects the problem with the primary tank. The phrase "at least temporarily" is used in recognition of the fact that the protection provided by a passive overflow discharge system may be limited in time by certain characteristics of one or more components of the system, such as the overflow repository. For example, the protection may be limited in time based on the capacity of an auxiliary tank/tanks or the dispersal rate of a leach field system used as the overflow repository. One additional aspect of the passive overflow discharge systems described herein is that they may provide improved reliability because they require a small number of simple components. As a result, the passive overflow discharge systems described herein may be less likely to malfunction than other more complicated systems.

Figure 1:
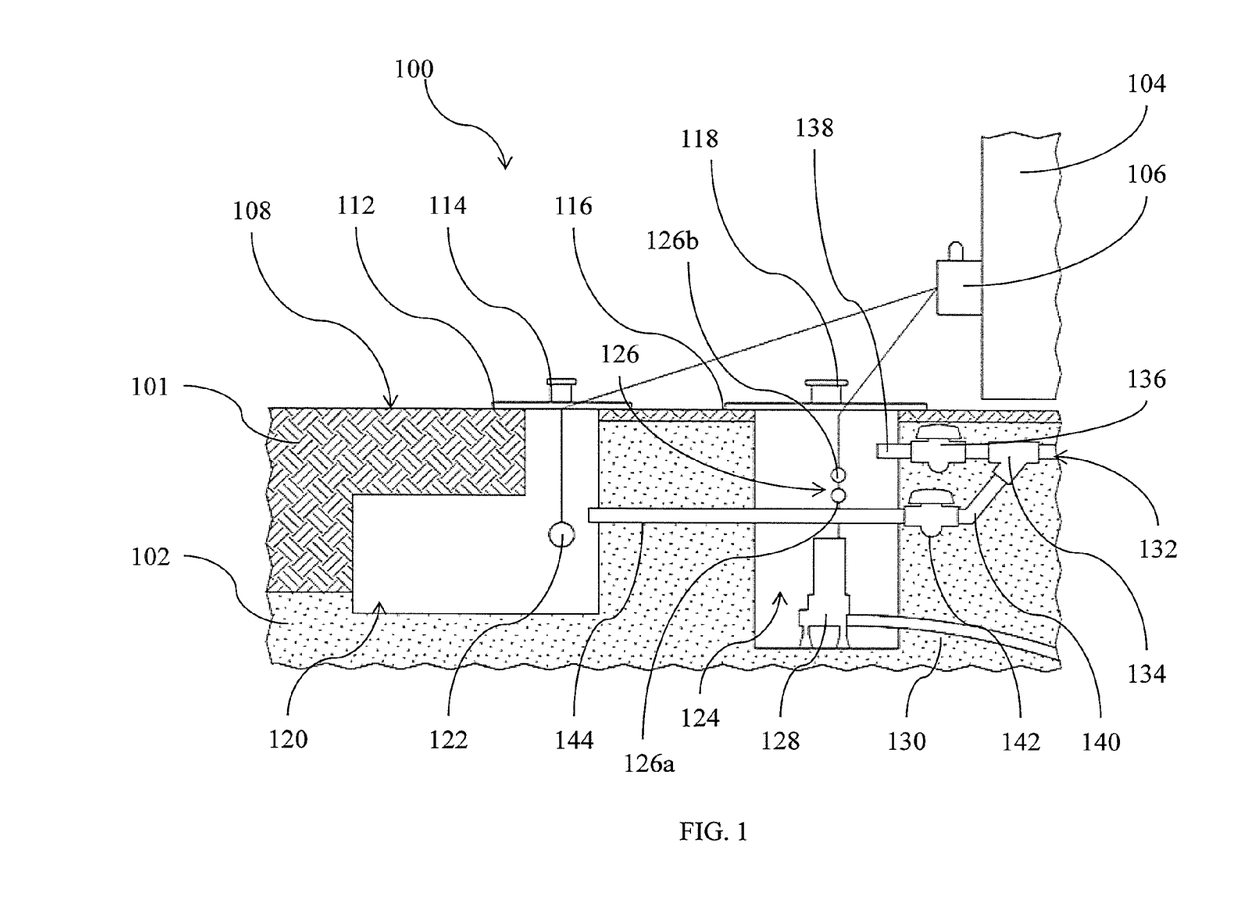
FIG. 1 shows a side elevation cross-sectional view of one embodiment of a septic system with a passive overflow discharge system that includes an auxiliary storage tank.

Turning now to the figures, FIG. 1 illustrates one embodiment of a septic system (100) with a passive overflow discharge system. This embodiment includes a primary tank (124) and an overflow repository comprising an auxiliary tank (120). It will be appreciated that in other embodiments, the overflow repository could comprise a leach field system (similar to that shown in FIG. 2), a plurality of auxiliary tanks, a basin (such as a retention basin), a filter bed, or any other type of additional repository configured to store and/or disperse wastewater. In the illustrated embodiment, both the primary tank (124) and auxiliary tank (120) are partially buried. The primary (124) and auxiliary (120) tank rest upon a gravel bedding (102) which provides support and minimizes settling. The body of the auxiliary tank (120) is partially covered by dirt fill (101) which provides protection while minimizing the weight placed upon the auxiliary tank (120). Instead of or in combination with the gravel and fill dirt shown in FIG. 1, other embodiments may include other suitable materials, including but not limited to sand and organic or man-made moisture absorbing minerals.

As shown in FIG. 1, the primary tank (124) has an exposed cover (116) which is installed at ground level (108) and which has an attached inspection port (118). In this embodiment, a conventional grinder pump (128) is installed in the interior cavity of the primary tank (124). The grinder pump (128) is configured to be selectively activated. When activated, the grinder pump (128) is configured to vacuum wastewater in the primary tank (124) into the grinder pump (128), grind it into a slurry and then pump the slurry through an outlet (130) where it exits the septic system (100) to a remote sewer line. As shown, a float system (126) is also installed within the interior cavity of the primary tank (124) and includes a first float switch or sensor (126a) and a second float switch or sensor (126b). In other embodiments, the float system (126) may comprise one float switch or three or more float switches depending on the particular application. In the illustrated embodiment, the first float switch (126a) is configured to activate the grinder pump (128) when the wastewater contained in the primary tank (124) reaches the first float switch (126a) in order to reduce the level of wastewater in the primary tank (124). The first float switch (126a) is further configured to deactivate the grinder pump (128) when the wastewater contained in the primary tank (124) returns to a level below the first float switch (126a). The second float switch (126b) is configured to activate a high level alarm (106) when the wastewater in the primary tank (120) reaches the second float switch (126b). The high level alarm (106) can be configured to provide an audible, visual, and/or other type of notification to the occupant that the level of wastewater in the primary tank (124) is nearing an overflow level. The high level alarm (106) can be part of a control panel that is mounted to the exterior of the structure (104), mounted to the interior of the structure (104) or in any other location suitable to provide adequate notice to the user. In some embodiments, the high level alarm (106) may be configured to provide an alert or notification directly to the user by sending a message to the user's e-mail account, computer, smart phone or other personal electronic device.

In the embodiment shown in FIG. 1, the auxiliary tank (120) includes an exposed cover (112) which is installed at ground level (108) and which includes an attached inspection port (114). The auxiliary tank (120) may also include a float system, similar to the float system (126) described above. As shown, the auxiliary tank (120) includes a float system comprising a first auxiliary float switch (122) installed within the interior cavity of the auxiliary tank (120). The first auxiliary float switch (122) can be configured to activate a high level alarm (106) when the wastewater in the auxiliary tank (120) reaches the first auxiliary float switch (122). In the illustrated embodiment, the first auxiliary float switch (122) is positioned below the point where the auxiliary overflow outlet (144) enters the auxiliary tank (120). This particular arrangement may be beneficial because, during normal operation, the first auxiliary float switch may provide an alert to the user before the wastewater in the auxiliary tank (120) reaches the auxiliary overflow outlet (144). The wastewater collected in the auxiliary tank (120) can then be removed at the user's convenience using any conventional means or method, including but not limited to vacuuming the wastewater out of the auxiliary tank (120) to an external tank/truck and/or including one or more pumps within the auxiliary tank (120) configured to pump the wastewater back into the primary tank (124) once the system is operating normally.

In the embodiment shown in FIG. 1, wastewater can be carried from the structure (104) into septic system (100) via a wastewater inlet (132). In this embodiment, the wastewater inlet (132) is in fluid communication with a diverter (134), which is positioned upstream relative to the primary tank (124), primary tank valve (136) and overflow valve (142). The diverter (134) may comprise a tee coupling or any other coupling, fitting or component configured to divert fluid into two or more branches. As shown, the diverter (134) allows wastewater to flow through a first branch to a primary tank valve (136) and through a second branch to a tank bypass (140) and on to an overflow valve (142). The primary tank valve (136) is in fluid communication with a primary tank inlet (138), which is in fluid communication with the primary tank (124) through a side wall in the upper portion of the primary tank (124). The overflow valve (142) is in fluid communication with an auxiliary overflow outlet (144), which is in fluid communication with the auxiliary tank (120) through a side wall in the upper portion of the auxiliary tank (120). In some alternate embodiments, instead of being in fluid communication with an overflow repository, such as the auxiliary tank (120), the auxiliary overflow outlet (144) may be configured to disperse wastewater directly into the surrounding area. The primary tank valve (136) and the overflow valve (142) are configured so that they can be manually opened and closed to selectively divert the flow of wastewater through the diverter (134). The primary tank valve (136) and the overflow valve (142) may be positioned either above-ground or below-ground, provided an occupant or other user can easily access them to manually open or close them as desired.

In the illustrated embodiment, when the primary tank valve (136) is open and the overflow valve (142) is closed, wastewater flows through the primary tank inlet (138) and into the primary tank (124). Alternatively, when the overflow valve (142) is open and the primary tank valve (136) is closed, wastewater flows through the auxiliary overflow outlet (144) into the auxiliary tank (120). During normal operation, the primary tank valve (136) is open and the overflow valve (142) is closed so that the wastewater is collected in the primary tank (124) and the grinder pump (128) vacuums wastewater in the primary tank (124) into the grinder pump (128), grinds it into a slurry and then pumps the slurry through an outlet (130) where it exits the septic system (100) to a remote sewer line. However, in some situations the level of the wastewater within the primary tank (124) may continue to rise. For example, the grinder pump (128) may be rendered inoperable due to loss of power or malfunction, or the outlet (130) may be clogged, resulting in an inability to reduce the wastewater level in the primary tank (124), or, even if the grinder pump (128) is functioning properly, the wastewater level within the primary tank (124) may continue to rise if the wastewater is entering the system at a rate faster than the grinder pump (128) can discharge the wastewater from the primary tank (124). By selectively opening and closing the primary tank valve (136) and the overflow valve (142), a user can take advantage of the passive overflow protection offered by the septic system (100), divert the wastewater away from the primary tank (124) and utilize the additional capacity provided by the auxiliary tank (120) to prevent an overflow back through wastewater inlet 132 and into the structure (104).

A septic system such as the one shown in FIG. 1 can be gravity fed so that wastewater travels through the system primarily under the force of gravity. As such, varying the placement of the components which transport wastewater, such as the diverter (134) can change the flow of wastewater. For example, if the diverter (134) were buried in such a way that the first branch exited the diverter (134) at a lower depth relative to the second branch, wastewater would flow through the first branch unless the primary tank valve (136) was closed or the primary tank (124) was full. With a septic system configured in this manner, both the primary tank valve (136) and the overflow valve (142) could be left open and wastewater would naturally be gravity fed to the primary tank (124) until it overflowed, causing the wastewater to then flow through the second branch of the diverter (134) to the auxiliary tank (120).

In an alternate embodiment, instead of having a separate primary tank valve (136) and overflow valve (142) as shown in FIG. 1, the flow of wastewater could be diverted by replacing the diverter (134) with a single three-way valve. In this manner, a user could manipulate the three-way valve to selectively divert water to the primary tank (124) or the auxiliary tank (120). In another alternate embodiment, the primary tank valve (136) and the overflow valve (142) could both comprise an electronically controlled valve. In such an embodiment, the electronically controlled primary tank valve (134) may be configured to remain open as long as it is receiving adequate power, but to transition to a closed position if it does not receive adequate power. On the contrary, the electronically controlled overflow valve (142) may be configured remain closed as long as it is receiving adequate power, but to transition to an open position if it does not receive adequate power. In this embodiment, if a power loss occurs to the system and the electronically controlled primary tank valve (134) and overflow valve (142) lose power, then the primary tank valve would transition to a closed position and the overflow valve (142) would transition to an open position, thereby allowing wastewater to be diverted from the primary tank (124) to the auxiliary tank (120) until power is restored to the system. In other alternate embodiments, additional auxiliary tanks (120) could be added as needed by adding additional diverters (134) and overflow valves (142) so that a user could extend the system to provide whatever level of protection was desired.

Figure 2:
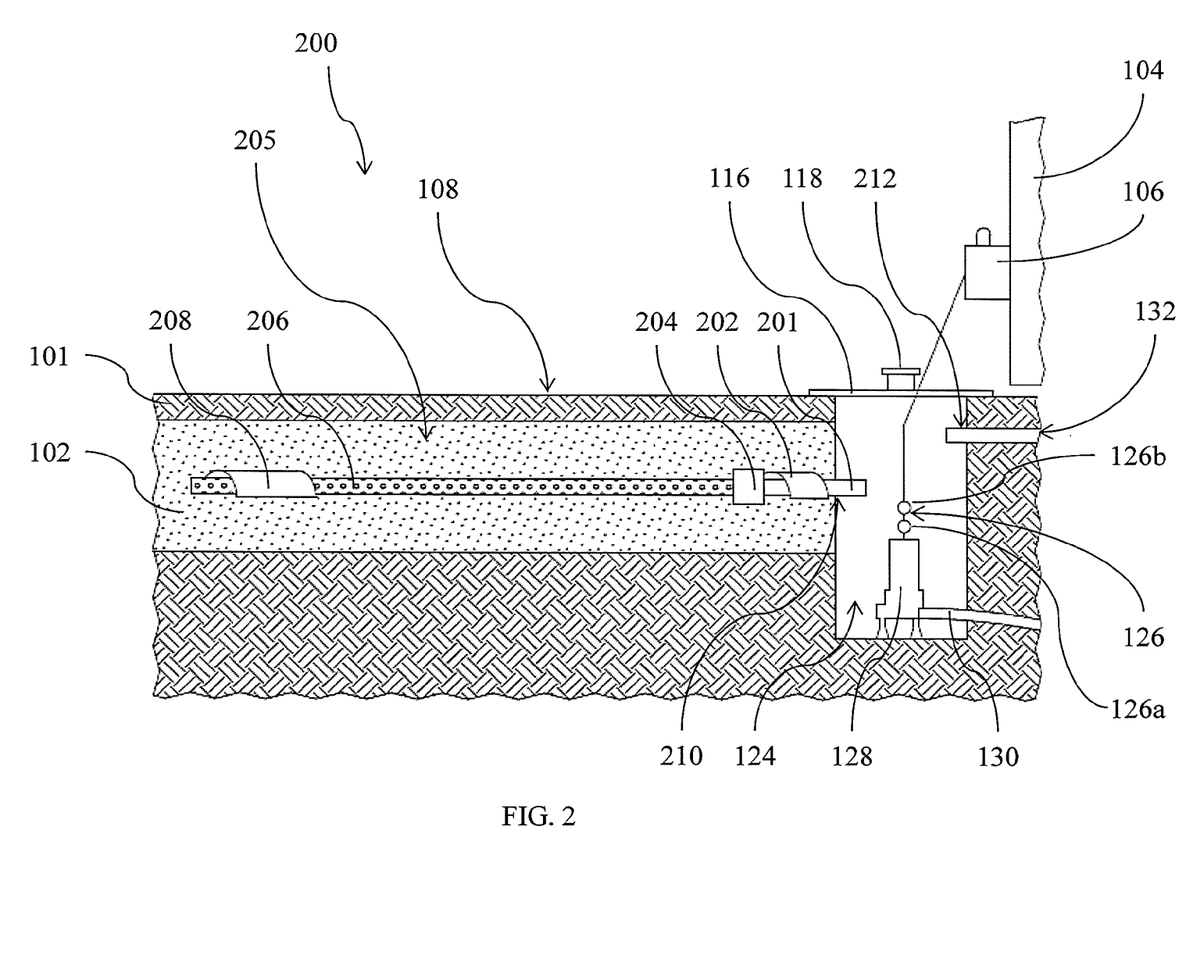
FIG. 2 shows a side elevation cross-sectional view of an alternate embodiment of a septic system with a passive overflow discharge system that includes a discharge to a leach field system.

Turning now to FIG. 2, that figure illustrates an alternate embodiment of a septic system (200) with a passive overflow discharge system. Septic system (200) includes a primary tank (124) and an overflow repository comprising a leach field system (205). The construction and installation of a conventional leach field system is well known within the art, and, as a result, will not be discussed in detail herein. It will be appreciated that in other embodiments, the overflow repository could comprise a single auxiliary tank (similar to that shown in FIGS. 1 and 3), a plurality of auxiliary tanks, or any other type of additional repository configured to store and/or disperse wastewater. Several of the components already discussed above in relation to FIG. 1 are shown again in FIG. 2 to provide context. These components have a similar form and function as in FIG. 1 and will be discussed further only in their relation to the differing components shown in FIG. 2. In this embodiment, a wastewater inlet (132) carries wastewater from the structure (104) and enters the primary tank (124) through a side wall of the primary tank (124) at an inlet position (212). An auxiliary overflow outlet (201) exits the primary tank (124) at an outlet position (210). As shown, the outlet position (210) of the auxiliary overflow outlet (201) is positioned below the inlet position (212) of the wastewater inlet (132). In other words, the outlet position (210) of the auxiliary overflow outlet (201) is between the floor of the primary tank (124) and the inlet position (212) of the wastewater inlet (132). In the illustrated embodiment, a first half moon casing (202) anchors and protects the auxiliary overflow outlet (201) where it exits the primary tank (124). A transition coupling (204) joins the auxiliary overflow outlet (201) with a perforated pipe (206). In this embodiment, the perforated pipe (206) is buried in gravel (102) and travels away from the house or structure (104). A far end of the perforated pipe is covered by a second half moon casing (208) which can provide stability and protection to the far end of the system.

In the embodiment shown in FIG. 2, the outlet position (210) at which the auxiliary overflow outlet (201) exits the primary tank (124) is situated at a depth that is above the float switch system (126), but below the inlet position (212) of the wastewater inlet (132). This particular positioning can be advantageous because it provides the opportunity for the second float switch (126b) to be activated, thereby activating the alarm (106) and alerting the user, while simultaneously providing an automatic overflow discharge system that will discharge excess wastewater from the primary tank (124) before it can reach the wastewater inlet (132) and travel back into the structure (104) without requiring any action by the user to initiate the auxiliary discharge.

As discussed above, in operation, wastewater enters the septic system (200) via the wastewater inlet (132) and fills the primary tank (124). As the primary tank (124) fills to a first wastewater level, the first float switch or sensor (126a) is actuated, thereby causing the grinder pump (128) to activate and reduce the wastewater to slurry and pump it away from the septic system (200) via the outlet (130). However, in some situations the level of the wastewater within the primary tank (124) may continue to rise. For example, the grinder pump (128) may be rendered inoperable due to loss of power or malfunction, or the outlet (130) may be clogged, resulting in an inability to reduce the wastewater level in the primary tank (124), or, even if the grinder pump (128) is functioning properly, the wastewater level within the primary tank (124) may continue to rise if the wastewater is entering the system at a rate faster than the grinder pump (128) can discharge the wastewater from the primary tank (124). In such a situation where the level of wastewater is rising, if the level of wastewater in the primary tank (124) reaches the second float switch or sensor (126b), then the second float switch (126) can be actuated, thereby causing the alarm (106) to activate and alert a user to the increasing/high wastewater level in the primary tank (124).

Whether or not the alarm (106) is triggered by the second float switch (126b), if the wastewater in the primary tank (124) continues to rise above the level of the second float switch (126b) and reaches a level that is equal to the outlet position (210) of the auxiliary overflow outlet (201), then additional wastewater will exit the primary tank (124) via the auxiliary overflow outlet (201) instead of continuing to fill the primary tank (124). Accordingly, the positioning of the auxiliary overflow outlet (201) relative to the wastewater inlet (132) prevents the wastewater level from reaching the upper position (212) and potentially causing an overflow back through the wastewater inlet (132) into the structure (104). Wastewater which exits the primary tank (124) via the auxiliary overflow outlet (201) travels through the perforated pipe (206) via the transition coupling (204) and is safely dispersed into the gravel bed (102) of the leach field system (205). As a result, in this embodiment, the overflow protection provided by the overflow repository (e.g., the leach field system (205)) is utilized without requiring any action by the user and can be utilized even if the user does not realize there is a problem. In some alternate embodiments, instead of being in fluid communication with an overflow repository, such as the leach field system (205), the auxiliary overflow outlet (201) may be configured to disperse wastewater directly into the surrounding area.

Figure 3:
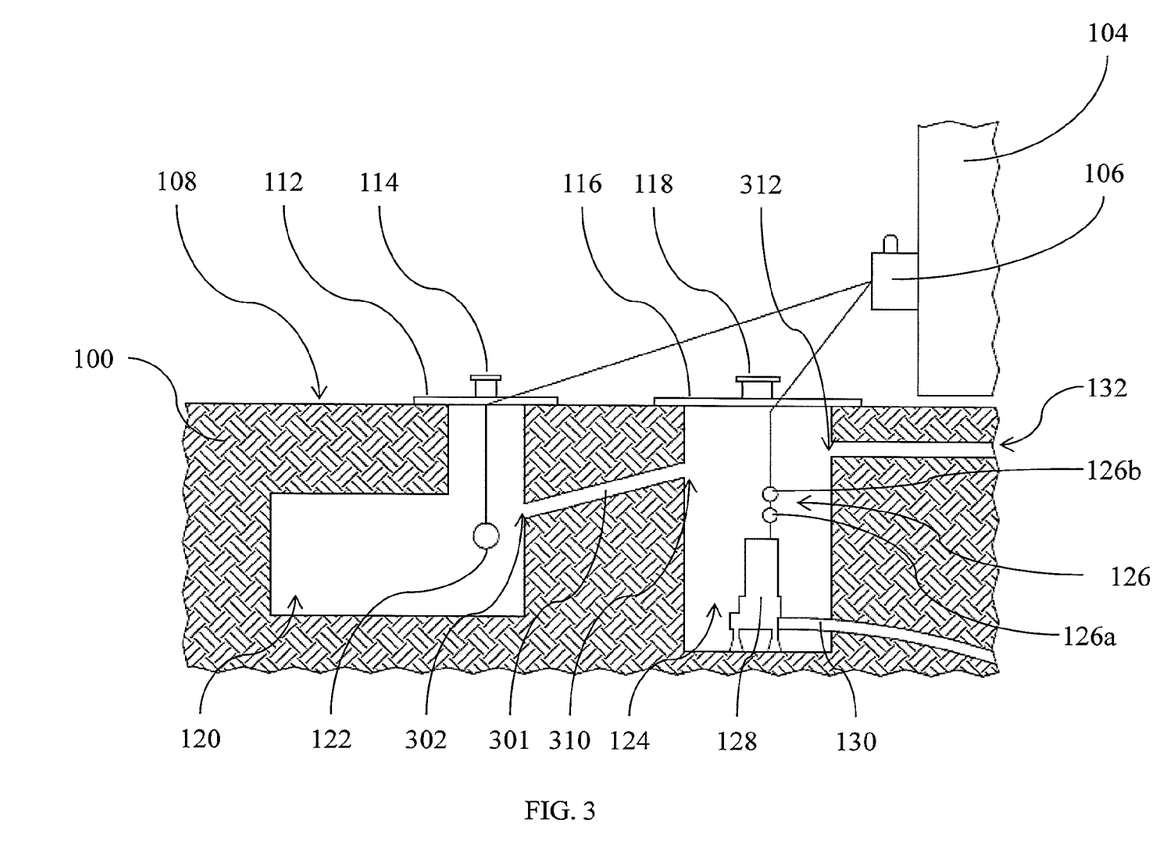
FIG. 3 shows a side elevation cross-sectional view of an alternate embodiment of a buried septic system with a passive overflow discharge system that includes an auxiliary storage tank.

Turning now to FIG. 3, that figure illustrates another alternate embodiment of a septic system (300) with a passive overflow discharge system. Septic system (300) includes a primary tank (124) and an overflow repository comprising an auxiliary tank (120). It will be appreciated that in other embodiments, the overflow repository could comprise a leach field system (similar to that shown in FIG. 2), a plurality of auxiliary tanks, or any other type of additional repository configured to store and/or disperse wastewater. Several of the components already discussed above in relation to FIGS. 1 and 2 are shown again in FIG. 3 to provide context. These components have a similar form and function as in FIGS. 1 and 2 and will be discussed further only in their relation to the differing components shown in FIG. 3. In this embodiment, a wastewater inlet (132) enters the primary tank (124) through a side wall at an inlet position (312) of the primary tank (124). Similar to the auxiliary overflow outlet (201) shown in FIG. 2 and described above, in the embodiment shown in FIG. 3, an auxiliary overflow outlet (301) exits the primary tank (124) through a side wall at an outlet position (210) of the primary tank (124). As shown, the outlet position (310) of the auxiliary overflow outlet (301) is positioned below the inlet position (312) of the wastewater inlet (132). In other words, the outlet position (310) of the auxiliary overflow outlet (301) is between the floor of the primary tank (124) and the inlet position (312) of the wastewater inlet (132). The auxiliary overflow outlet (301) descends and enters an auxiliary tank (120) through a side wall of the auxiliary tank (120) at an auxiliary overflow inlet position (302). In the illustrated embodiment, the auxiliary overflow inlet position (302) is situated at a depth that is below the outlet position (310) so that the overflow wastewater is urged to travel from the primary tank (124) through the auxiliary overflow outlet (301) into the auxiliary tank (124) due to gravity.

In the embodiment shown in FIG. 3, the outlet position (310) at which the auxiliary overflow outlet (301) exits the primary tank (124) is situated at a depth that is above the float switch system (126), but below the inlet position (312) of the wastewater inlet (132). This particular positioning can be advantageous because it provides the opportunity for the second float switch (126b) to be activated, thereby activating the alarm (106) and alerting the user, while simultaneously providing an automatic overflow discharge system that will discharge excess wastewater from the primary tank (124) before it can reach the wastewater inlet (132) and travel back into the structure (104) without requiring any action by the user to initiate the auxiliary discharge.

As discussed above, in operation, wastewater enters the septic system (300) via the wastewater inlet (132) and fills the primary tank (124). As the primary tank (124) fills to a first wastewater level, the first float switch or sensor (126a) is actuated, thereby causing the grinder pump (128) to activate and reduce the wastewater to slurry and pump it away from the septic system (200) via the outlet (130). However, in some situations the level of the wastewater within the primary tank (124) may continue to rise. For example, the grinder pump (128) may be rendered inoperable due to loss of power or malfunction, or the outlet (130) may be clogged, resulting in an inability to reduce the wastewater level in the primary tank (124), or, even if the grinder pump (128) is functioning properly, the wastewater level within the primary tank (124) may continue to rise if the wastewater is entering the system at a rate faster than the grinder pump (128) can discharge the wastewater from the primary tank (124). In such a situation where the level of wastewater is rising, if the level of wastewater in the primary tank (124) reaches the second float switch or sensor (126b), then the second float switch (126) can be actuated, thereby causing the alarm (106) to activate and alert a user to the increasing/high wastewater level in the primary tank (124).

Whether or not the alarm (106) is triggered by the second float switch (126b), if the wastewater in the primary tank (124) continues to rise above the level of the second float switch (126b) and reaches a level that is equal to the outlet position (310) of the auxiliary overflow outlet (301), then additional wastewater will exit the primary tank (124) via the auxiliary overflow outlet (301) instead of continuing to fill the primary tank (124). Accordingly, the positioning of the auxiliary overflow outlet (301) relative to the wastewater inlet (132) prevents the wastewater level from reaching the upper position (312) which could result in an overflow back through the wastewater inlet (132) into the structure (104). Wastewater which exits the primary tank (124) via the auxiliary overflow outlet (301) travels through the auxiliary overflow outlet (301) and is collected in the auxiliary tank (120). As a result, in this embodiment, the overflow protection provided by the overflow repository (e.g., the auxiliary tank (120)) is utilized without requiring any action by the user and can be utilized even if the user does not realize there is a problem. In some alternate embodiments, instead of being in fluid communication with an overflow repository, such as the auxiliary tank (120), the auxiliary overflow outlet (301) may be configured to disperse wastewater directly into the surrounding area.

It will be appreciated that some embodiments may not include certain features, such as a grinder pump in the primary tank, an alarm, and/or float systems, but those embodiments could still benefit from the passive overflow protection provided by the embodiments discussed above. For example, instead of using a grinder pump in the primary tank to force the wastewater out of the primary tank, the primary tank may be regularly pumped empty by a wastewater removal service. In such an embodiment, an overflow repository, such as one or more auxiliary tanks or a leach field system, could still provide a factor of convenience for a user who could not immediately schedule a removal service by adding days or weeks of additional system use.

It will also be appreciated that the various inlets and outlets discussed herein (e.g., outlet (130), wastewater inlet (132), primary tank inlet (138), tank bypass (140), auxiliary overflow outlets (144, 201, 301), and perforated pipe (206)) are pipes or conduits configured to allow wastewater to travel through the various septic systems, and those components may comprise any material or combination of materials suitable to provide such functionality and/or typically used in conventional septic systems, including but not limited to plastic such as polyvinyl chloride (PVC), ductile iron, steel, cast iron, copper, and lead. Furthermore, embodiments of the septic systems (100, 200, 300) described herein may be configured and used to service residential structures and users.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A septic system comprising:
    a primary tank, wherein the primary tank comprises an interior cavity;
    a wastewater inlet, wherein the wastewater inlet is in fluid communication with the interior cavity of the primary tank via a primary tank inlet; and
    a passive overflow discharge system, wherein the passive overflow discharge system comprises
        an overflow repository that is in fluid communication with at least one of the interior cavity of the primary tank and the wastewater inlet,
        a diverter, wherein the diverter is in fluid communication with the wastewater inlet and comprises a first branch and a second branch,
        a primary tank valve, wherein the primary tank valve is in fluid communication with both the first branch of the diverter and the primary tank, wherein the primary tank valve is configured to be selectively transitioned between an open position and a closed position, wherein the primary tank valve is configured to allow wastewater to flow into the primary tank via the primary tank inlet when the primary tank valve is in the open position, wherein the primary tank valve is configured to prevent wastewater from flowing into the primary tank via the wastewater inlet when the primary tank valve is in the closed position,
        an auxiliary overflow outlet, wherein the auxiliary overflow outlet is in fluid communication with the overflow repository, and
        an overflow valve, wherein the overflow valve is in fluid communication with both the second branch of the diverter and the overflow repository, wherein the overflow valve is configured to be selectively transitioned between an open position and a closed position, wherein the overflow valve is configured to allow waste water to flow into the overflow repository via the auxiliary overflow outlet when the overflow valve is in the open position, wherein the overflow valve is configured to prevent wastewater from flowing into the overflow repository via the auxiliary overflow outlet when the overflow valve is in the closed position;
    wherein the septic system further comprises at least one float switch positioned in at least one of the primary tank and the overflow repository.

2. The septic system of claim 1, wherein the passive overflow discharge system is automatic.

3. The septic system of claim 1, wherein the overflow repository comprises an auxiliary tank.

4. The septic system of claim 1, wherein the overflow repository comprises a leach field system.

5. The septic system of claim 1, wherein the primary tank valve comprises an electronically controlled valve configured to transition from the open position to the closed position in the event the primary tank valve stops receiving adequate power.

6. The septic system of claim 1, wherein the overflow valve comprises an electronically controlled valve configured to transition from the closed position to the open position in the event the overflow valve stops receiving adequate power.

7. A septic system comprising:
    a primary tank, wherein the primary tank comprises an interior cavity;
    a wastewater inlet, wherein the wastewater inlet is in fluid communication with the interior cavity of the primary tank via a primary tank inlet;
    a diverter, wherein the diverter is in fluid communication with the wastewater inlet and comprises a first branch and a second branch;
    a primary tank valve, wherein the primary tank valve is in fluid communication with both the first branch of the diverter and the primary tank, wherein the primary tank valve is configured to be selectively transitioned between an open position and a closed position, wherein the primary tank valve is configured to allow wastewater to flow into the primary tank via the primary tank inlet when the primary tank valve is in the open position, wherein the primary tank valve is configured to prevent wastewater from flowing into the primary tank via the wastewater inlet when the primary tank valve is in the closed position;
    an overflow repository;
    an auxiliary overflow outlet, wherein the auxiliary overflow outlet is in fluid communication with the overflow repository;
    an overflow valve, wherein the overflow valve is in fluid communication with both the second branch of the diverter and the overflow repository, wherein the overflow valve is configured to be selectively transitioned between an open position and a closed position, wherein the overflow valve is configured to allow wastewater to flow into the overflow repository via the auxiliary overflow outlet when the overflow valve is in the open position, wherein the overflow valve is configured to prevent wastewater from flowing into the overflow repository via the auxiliary overflow outlet when the overflow valve is in the closed position.

8. The septic system of claim 7, wherein the overflow repository comprises an auxiliary tank.

9. The septic system of claim 7, wherein the overflow repository comprises a leach field system.

10. The septic system of claim 7, wherein the primary tank valve is configured to be manually transitioned between the open position and the closed position.

11. The septic system of claim 7, wherein the overflow valve is configured to be manually transitioned between the open position and the closed position.

12. The septic system of claim 7, wherein the primary tank valve is configured to be manually transitioned between the open position and the closed position and the overflow valve is configured to be manually transitioned between the open position and the closed position.

13. A septic system comprising:
    a primary tank, wherein the primary tank comprises an interior cavity and a floor;
    a wastewater inlet, wherein the wastewater inlet is in fluid communication with the interior cavity of the primary tank via a primary tank inlet at an inlet position;

an overflow repository;
a first auxiliary overflow outlet, wherein a first end of the first auxiliary overflow outlet is in fluid communication with the interior cavity of the primary tank at an outlet position, wherein a second end of the first auxiliary overflow outlet is in fluid communication with the overflow repository, wherein the outlet position of the first auxiliary overflow outlet is situated between the floor of the primary tank and the inlet position of the primary tank inlet;
a diverter, wherein the diverter is in fluid communication with the wastewater inlet and comprises a first branch and a second branch;
a primary tank valve, wherein the primary tank valve is in fluid communication with both the first branch of the diverter and the primary tank, wherein the primary tank valve is configured to be selectively transitioned between an open position and a closed position, wherein the primary tank valve is configured to allow wastewater to flow into the primary tank via the primary tank inlet when the primary tank valve is in the open position, wherein the primary tank valve is configured to prevent wastewater from flowing into the primary tank via the wastewater inlet when the primary tank valve is in the closed position; and
a second auxiliary overflow outlet, wherein the second auxiliary overflow outlet is in fluid communication with the overflow repository;
an overflow valve, wherein the overflow valve is in fluid communication with both the second branch of the diverter and the overflow repository, wherein the overflow valve is configured to be selectively transitioned between an open position and a closed position, wherein the overflow valve is configured to allow wastewater to flow into the overflow repository via the second auxiliary overflow outlet when the overflow valve is in the open position, wherein the overflow valve is configured to prevent wastewater from flowing into the overflow repository via the second auxiliary overflow outlet when the overflow valve is in the closed position.

14. The septic system of claim 13, wherein the overflow repository comprises an auxiliary tank.

15. The septic system of claim 14, wherein the first auxiliary overflow outlet is in fluid communication with the overflow repository at a first auxiliary overflow inlet position, wherein the first auxiliary overflow inlet position is situated at a depth that is below the outlet position of the first auxiliary overflow outlet in the primary tank.

16. The septic system of claim 13, wherein the overflow repository comprises a leach field system.

17. The septic system of claim 16, wherein the leach field system comprises a perforated pipe that is in fluid communication with the auxiliary overflow outlet.

18. The septic system of claim 13 further comprising a float system, wherein the float system is positioned within the interior cavity of the primary tank, wherein the float system comprises at least one float switch.

19. The septic system of claim 18, wherein the outlet position of the first auxiliary overflow outlet in the primary tank is above the at least one float switch.

* * * * *